(12) United States Patent
Magenheimer et al.

(10) Patent No.: US 8,775,755 B2
(45) Date of Patent: Jul. 8, 2014

(54) PEER-TO-PEER TRANSCENDENT MEMORY

(75) Inventors: Daniel Magenheimer, Fort Collins, CO (US); Kurt Hackel, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 13/224,527

(22) Filed: Sep. 2, 2011

(65) Prior Publication Data

US 2012/0222052 A1 Aug. 30, 2012

Related U.S. Application Data

(60) Provisional application No. 61/446,650, filed on Feb. 25, 2011.

(51) Int. Cl.
*G06F 13/00* (2006.01)
(52) U.S. Cl.
USPC ............................................. 711/162
(58) Field of Classification Search
None
See application file for complete search history.

(56) References Cited

U.S. PATENT DOCUMENTS

| | | | |
|---|---|---|---|
| 6,026,474 A * | 2/2000 | Carter et al. ............... | 711/202 |
| 2005/0262505 A1 | 11/2005 | Esfahany et al. | |
| 2007/0156963 A1 | 7/2007 | Chen et al. | |
| 2008/0229053 A1 | 9/2008 | Campini et al. | |
| 2009/0055601 A1 | 2/2009 | McKenney et al. | |
| 2010/0185817 A1 | 7/2010 | Magenheimer | |
| 2010/0186011 A1 | 7/2010 | Magenheimer | |
| 2010/0268881 A1 | 10/2010 | Galchev et al. | |
| 2011/0066597 A1 * | 3/2011 | Mashtizadeh et al. ........ | 707/640 |

OTHER PUBLICATIONS

U.S. Appl. No. 12/356,389, filed Jan. 20, 2009, Advisory Action mailed Jun. 4, 2012, 3 pages.
U.S. Appl. No. 12/356,389, filed Jan. 20, 2009, Final Office Action mailed Feb. 22, 2012, 15 pages.
U.S. Appl. No. 12/716,441, filed Mar. 3, 2010, Final Office Action mailed Jun. 4, 2012, 17 pages.
U.S. Appl. No. 12/716,441, filed Mar. 3, 2010, Office Action mailed Mar. 20, 2012, 22 pages.
Author Unknown, "RNA/MVX Memory Motion: bring RAM resources to the servers that need it most," RNA, 2010, 4 pages, retrieved on Dec. 9, 2011 from http://web.archive.org/web/20101011130905/http://manetworks.com/memory-motion.
Bugnion, et al., "Disco: Running Commodity Operating Systems on Scalable Multiprocessors," ACM Transactions on Computer Systems, vol. 15, No. 4, Nov. 1997, pp. 412-447.

(Continued)

*Primary Examiner* — Duc Doan
(74) *Attorney, Agent, or Firm* — Kilpatrick Townsend & Stockton LLP

(57) ABSTRACT

Various arrangements for utilizing memory of a remote computer system are presented. Two computer systems may allocate a portion of RAM accessible to a memory-access API. A first set of data from the first portion of the first memory of a first computer system may be determined to be moved to memory of another computer system. The first set of data from the first portion of the first memory may be transmitted for storage in the second portion of the second memory of a second computer system. Using the second memory-access API, the set of data may be stored in the second portion of the second memory. Using the first memory-access API, the set of data from the first portion of the first memory may be deleted.

17 Claims, 8 Drawing Sheets

(56) References Cited

OTHER PUBLICATIONS

Lim, Kevin, "Disaggregated Memory Architectures for Blade Servers," A dissertation submitted in partial fulfillment of the requirements for the degree of Doctor of Philosophy (Computer Science and Engineering) in The University of Michigan, 2010, 148 pages, Retrieved on Dec. 14, 2011 from http://www.eecs.umich.edu/~tnm/trev_test/dissertationsPDF/kevinL.pdf.

Lu, Pin et al., "Virtual Machine Memory Access Tracing with Hypervisor Exclusive Cache," USENIX Association, USENIX Annual Technical Conference 2007, pp. 29-43.

Tanenbaum, Andrew s., et al. "Distributed Systems Principles and Paradigms," 2002, 20 pages, Prentice Hall, New Jersey.

U.S. Appl. No. 12/356,389, filed Jan. 20, 2009, Office Action mailed Sep. 20, 2011, 25 pages.

Jones, Stephen T., "Geiger: Monitoring the Buffer Cache in a Virtual Machine Environment," ASPLOS 2006, Oct. 21-25, 2006, pp. 14-24, San Jose, CA.

* cited by examiner

PEER-TO-PEER TRANSCENDENT MEMORY

CROSS-REFERENCES

This application claims priority to Provisional U.S. Pat. Appl. No. 61/446,650 filed on Feb. 25, 2011, entitled "Peer-to-Peer Transcendent Memory." This application is hereby incorporated for all purposes.

This application is related to U.S. patent application Ser. No. 12/356,389, filed on Jan. 20, 2009, entitled "Methods and Systems for Implementing Transcendent Page Caching." This application is hereby incorporated for all purposes. This application is also related to U.S. patent application Ser. No. 12/716,441, filed on Mar. 3, 2010, entitled "Methods and Systems for Implementing Transcendent Page Caching." This application is also hereby incorporated for all purposes.

BACKGROUND

Distributed Shared Memory (DSM) refers to the sharing of random access memory (RAM) resources across multiple computer systems. While, in theory, DSM allows for computer systems to effectively share RAM, several concerns have limited DSM's applicability. First, moving data between computer systems can be a time intensive process compared to accessing local RAM or a local hard disk. Second, many implementations of DSM focus on remote access of RAM at a granular level. As such, access to remote RAM using DSM may be at a byte, word, or cache line level. Third, users of different types of RAM could access remote RAM using DSM from other computer systems. This may result in unpredictable performance for storing and recalling data, and possibly slower performance than accessing a local hard disk.

SUMMARY

Various methods, systems, and computer programs that allow a first computer to utilize the storage of a second computer system are described. In some embodiments, a method for a first computer system to utilize storage of a second computer system is presented. The method may include allocating, by the first computer system, a first portion of a first memory of the first computer system for use by a first memory-access application programming interface (API). The method may include allocating, by the second computer system, a second portion of a second memory of the second computer system to be allocated for use by a second memory-access API. The method may include determining, by the first computer system, to move a set of data from the first portion of the first memory of the first computer system to memory of another computer system. The method may include transferring, by the first computer system, to the second computer system, the first set of data from the first portion of the first memory for storage in the second portion of the second memory of the second computer system. The method may include storing, by the second computer system, using the second memory-access API, the set of data in the second portion of the second memory.

Embodiment may include one or more of the following: Data stored in the first portion of the first memory and the second portion of the second memory may be stored in fixed-size memory pages. Transferring, by the first computer system, to the second computer system, the first set of data from the first portion of the first memory to the second portion of the second memory of the second computer system may comprise transferring a minimum of one memory page. The method may include transmitting, by the first computer system, to the second computer system, a request for the set of data. The method may include retrieving, by the second computer system, the set of data using the second API. The method may include transmitting, by the second computer system, the set of data to the first computer system. The method may include transmitting, by the first computer system, to each computer system of a plurality of computer systems, a request for available memory resources, wherein the plurality of computer systems comprises the second computer system. The method may include receiving, by the first computer system, from each computer system of the plurality of computer systems, a response indicating an availability of memory resources at the corresponding computer system of the plurality of computer systems. The method may include allocating, by the second computer system, a superpage of the second portion of the second memory to the first computer system. The superpage may comprise a plurality of pages. A size of the superpage may be predetermined. The first computer system may be permitted access to the superpage. Determining to move the first set of data from the first portion of the first memory of the first computer system to memory of another computer system may comprise identifying, by the first computer system, the second computer system having sufficient available memory resources in the second portion of the second memory to store the set of data. Determining, by the first computer system, to move the set of data from the memory of the first computer system to memory of another computer system may further comprise determining that storing the set of data in memory of another computer system will result in a faster access time to the set of data than storing the set of data on a computer-readable disk.

In some embodiments, a computer program product residing on a non-transitory processor-readable medium and comprising processor-readable instructions is presented. The instructions may be configured to cause a processor to allocate a first portion of a first memory of a first computer system for use by a first memory-access application programming interface (API). The instructions may be configured to cause a processor to determine to move a set of data from the first portion of the first memory of the first computer system to memory of another computer system. The instructions may be configured to cause a processor to cause a transfer to a second computer system of the first set of data from the first portion of the first memory for storage in a second portion of a second memory of the second computer system. The instructions may be configured to cause a processor to cause, using the first memory-access API, the set of data from the first portion of the first memory to be deleted.

In some embodiments, a memory access system for a first computer system to utilize storage of a second computer system is presented. The system may include the first computer system. The first computer system may include a first processor; and a first memory communicatively coupled with and readable by the first processor and having stored therein a first series of processor-readable instructions. The instructions when executed by the first processor, cause the first processor to allocate a first portion of the first memory reserved for use by a first memory-access application programming interface (API). The instructions when executed by the first processor, cause the first processor to determine to move a set of data from the first portion of the first memory to memory of another computer system. The instructions when executed by the first processor, cause the first processor to cause the first set of data from the first portion of the first memory to be transferred for storage to the second computer system. The instructions when executed by the first processor, cause the first processor to cause, using the first memory-access API, the set of data from the first portion of the first memory to be deleted. The system may include the second computer system. The second computer system may include a second processor; and a second memory communicatively coupled with and readable by the second processor and having stored therein a second series of processor-readable instructions. The instructions, when executed by the second processor, cause the second processor to allocate a second portion of the second memory of the second computer system reserved for use by a second memory-access API. These instructions may also cause the second processor to cause the set of data in the second portion of the second memory to be stored using the second memory-access API.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
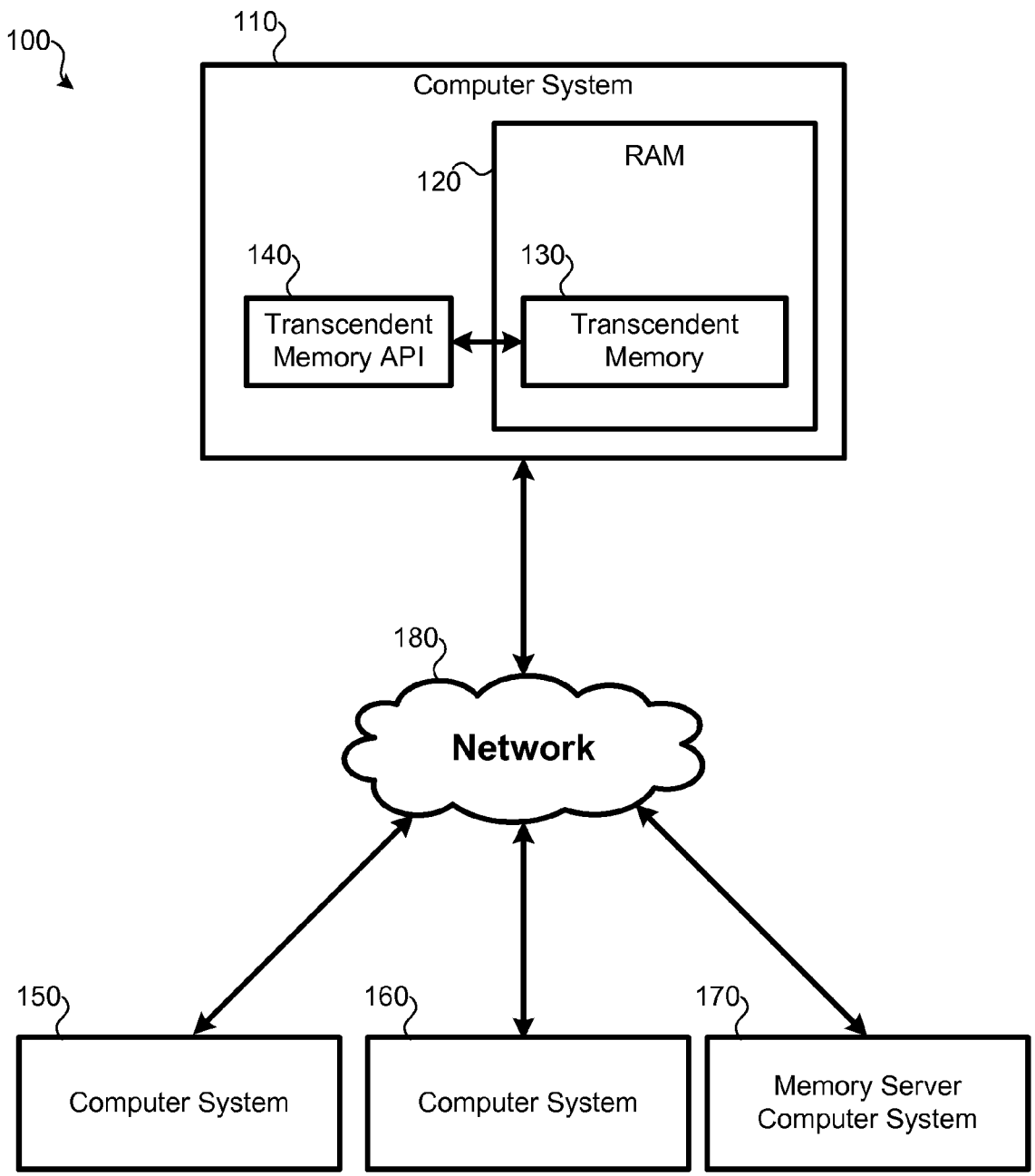
FIG. 1 illustrates an embodiment of a system that is configured to allow memory resources to be allocated across two or more computer systems.

Typically, memory (e.g., random access memory) usage of multiple computer systems, including computer systems operating on the same local network, such as at a data center, is independent of each other. If a first computer system is experiencing a high memory load, a second computer system that is networked with the first computer may not be experiencing a similar high memory load. As such, while a first computer system is experiencing a high memory load, a second computer system (which may be a computer system at the same data center) may be experiencing an average or low memory load. Therefore, while performance of the first computer system may be negatively affected by lacking sufficient memory resources (for example, the first computer system may rely on the use of a disk-based swap file once the first computer's RAM is full or nearly full), the second computer system may have memory that is unused.

Using memory that can be shared by multiple computer systems, referred to herein as transcendent memory, in conjunction with a sufficiently fast network connection (or some other form of communication link), may allow such multiple computer systems to efficiently share memory resources. Referring to the previous example, the first computer system experiencing the high memory load may be able to transfer data stored in RAM to RAM of the second computer system that is experiencing the lower memory load. Storing data in another computer system's transcendent memory, rather than storing the data locally using a hard disk (e.g., a swap file) or some other local storage medium that is slower than RAM, may speed the first computer system's access time to the data, and thus may result in an increase in the first computer system's overall performance.

Using transcendent memory along with an efficient network connection, a computer system may be able to store data in the RAM of another computer system and, later, retrieve the data faster than if the data had been stored locally using a storage device besides RAM, such as a hard disk. Transcendent memory may be a portion of a computer system's RAM that is dynamic in size. This portion of RAM may only be accessed by a transcendent memory application programming interface (API). As such, any data to be stored in the transcendent memory or read from the transcendent memory may only be accessed via the transcendent memory API.

Data to be stored in transcendent memory and retrieved from transcendent memory may be restricted to memory pages. As such, if data is to be written to transcendent memory of another computer, an entire memory page may be written to the other computer's transcendent memory. If the overall RAM of the computer system and/or the computer system's transcendent memory are experiencing a high load and data is to be stored using a second computer system's transcendent memory, a minimum of one memory page may be transferred for storage to the second computer system's transcendent memory. Similarly, when the data is retrieved from the second computer system, a minimum of one entire memory page may be retrieved.

Data in transcendent memory may be stored locally and remotely. Data may initially be stored by a first computer system in local transcendent memory. Once the local transcendent memory is full or nearly full and/or the total RAM of the computer system is full or nearly full (collectively referred to as a "high memory load"), data from the local transcendent memory may be transferred for storage to a second computer system's transcendent memory. The data may then be deleted in the first computer system's transcendent memory. Data stored in transcendent memory may be compressed.

A first computer system that utilizes transcendent memory may be in communication with one or more other computer systems that also utilize transcendent memory. When the first computer system is experiencing a high memory load, the first computer system may send a request to some or all of the other computer systems that have transcendent memory. Each computer system receiving the request may respond with an indication of 1) whether the computer system has available memory resources; and 2) how much transcendent memory is available. Based on the responses received, the computer system may determine which computer system to use for remote storage. The data may be transmitted to the remote computer system for storage in transcendent memory.

In some embodiments, a first computer system may have data stored in the transcendent memory of multiple other computer systems. In order to be able to retrieve the data from storage on a second computer system's transcendent memory, the first computer system may store an indication of the memory page from the second computer that has stored the memory page. Once a memory page has been retrieved from the transcendent memory of the second computer system, the corresponding transcendent memory at the second computer may be freed. Further details of transcendent memory are provided in relation to the figures.

FIG. 1 illustrates an embodiment of a system 100 that is configured to allow memory resources to be allocated across two or more computer systems. System 100 may include computer system 110, network 180, computer system 150, computer system 160, and memory server computer system 170. Other embodiments may have more or fewer computer systems in communication with computer system 110. Collectively, computer systems 110, 150, 160, and 170 may be referred to as a cluster, and may communicate peer-to-peer. Computer system 110 may include computer-readable random access memory (RAM) 120, transcendent memory 130, and transcendent memory API 140.

Computer system 110 may be running one or more applications. In some embodiments, computer system 110 may be an enterprise-level server that executes one or more enterprise applications that are accessible by one or more end users. In some embodiments, computer system 110 may be an end user computer system. The memory load of computer system 110 may fluctuate between being high and low. If the memory load of RAM 120 is low, portions of RAM 120 may be allocated to processes running on computer system 110 and as a cache for disk pages. Using a RAM cache for disk pages may speed performance of computer system 110 by eliminating some amount of time that computer system 110 would need to wait for data of the disk pages to be retrieved from its hard disk, which typically take significantly longer to access than RAM.

As the memory load of computer system 110 increases, the cache for disk pages may be scaled back or eliminated. If, after an operating system has eliminated all non-critical uses of RAM 120, insufficient memory still remains (e.g., the memory is overcommitted), another storage device, such as a hard drive, can be used through a process called swapping, effectively allowing the hard drive to function as (slow) random access memory. For small amounts of data and/or for short periods of time, the use of swapping on a hard drive for memory may provide acceptable performance. However, as the amount of information needed to be swapped increases, the performance of computer system 110 may deteriorate due to having to access a hard drive more frequently. As such, using the RAM (or other memory) of a remote computer system may result in faster performance of computer system 110.

Information that is stored in RAM 120 may be stored in a portion of RAM 120 allocated as transcendent memory 130. Transcendent memory 130 may be a portion of RAM 120 that is only accessible via transcendent memory API 140. As such, requests to store or retrieve ("get") data in transcendent memory 130 may need to be performed using transcendent memory API 140. Transcendent memory API 140 may define a set of rules that defines how transcendent memory 130 may be used. For example, to access transcendent memory 130 using transcendent memory API 140, a copy-based synchronous interface may be used. The API is discussed in more detail in previously referenced U.S. patent application Ser. No. 12/356,389. Transcendent memory 130, thus, may be indirectly accessed by processes being executed by computer system 110. Processes, including processes for applications and/or operating systems, may request data be written or retrieved from transcendent memory 130 via transcendent memory API 140. Transcendent memory API 140 may perform the necessary actions to store and/or retrieve the data requested by the process.

Transcendent memory 130 may vary in size according to the memory load of RAM 120. As the load of (non transcendent) memory of RAM 120 increases, space may be attempted to be reclaimed. This may result in puts to transcendent memory using transcendent memory API 140. As such, transcendent memory on other computer systems (e.g., computer system 150) may grow to reduce the demand on non-transcendent memory. Information stored in transcendent memory 130 may be compressed. Information compressed in transcendent memory 130 may be permitted as long as the original information can be recreated from the compressed information. As such, a greater amount of data may be able to be stored in transcendent memory than in uncompressed portions of RAM 120.

Transcendent memory 130 may store information in memory pages. A memory page may be a block of memory that has contiguous memory addresses. Memory pages may or may not be a fixed size. A memory page may be the smallest unit of data used for transcendent memory allocation. Conventional memory allocation using memory pages may be performed by an operating system with memory pages being transferred between RAM 120 and some other storage device, such as a hard disk drive. Similar memory pages may be used for storage of data within transcendent memory 130. In some embodiments, a memory page may be 4096 bytes in size.

The maximum amount of RAM 120 reserved as transcendent memory 130 may be dynamic. Various policies may be used to limit how much memory is allocated for transcendent memory versus non-transcendent memory. If RAM 120 has a high load, memory pages stored in transcendent memory 130 may be transferred to another computer system for storage in that computer system's transcendent memory. Computer system 110 may send a memory page of data from transcendent memory 130 of computer system 110 to transcendent memory of another computer system that it is communicatively connected with. If no space is available on transcendent memory on another computer system, computer system 110 may either discard the memory page (for an ephemeral page) or swap to disk (for a persistent page). In system 100, computer system 110 is communicatively connected with computer system 150 and computer system 160 via network 180 (collectively forming a cluster of computer systems). Computer system 110 (which may be part of the cluster that also includes computer system 150, computer system 160, and memory server computer system 170) may also be communicatively connected with memory server computer system 170 via network 180. Network 180 may represent one or more public and/or private networks. For example, network 180 may be a corporate intranet. Network 180 may be a network that is capable of allowing communication between computer system 110, computer system 150, computer system 160, and memory server computer system 170, and may occur faster than computer system 110 would be able to access some local storage mediums, such as a hard drive. As an example, network 180 may be a 10 gigabit Ethernet midplane, PCI-Express, or infiniband.

Computer system 150 and computer system 160 may contain similar components to computer system 110. Components, such as RAM, RAM allocated as transcendent memory, and a transcendent memory API, are not illustrated for computer systems 150 and 160 to maintain the simplicity of FIG. 1. Such components may be present. Memory server computer system 170 may also contain components similar to computer system 110. Memory server computer system 170 may refer to a computer system that is dedicated to providing transcendent memory resources to computer systems that are experiencing a high memory load. As such, memory server computer system 170 may provide transcendent memory for multiple computer systems at the same time. Memory server computer system 170 may not execute applications and/or processes unrelated to serving as a server for transcendent memory.

Computer system 150, computer system 160, and memory server computer system 170 may receive requests for transcendent memory from computer system 110. Each of these computer systems may then check their respective available transcendent memory. Each of these computer systems may respond to computer system 110 with a response that indicates whether or not it has available transcendent memory along with an indication of how plentiful the transcendent memory is. If using an active protocol, a computer system, such as computer system 150 may respond to each transcendent memory put with an indication that the data has been accepted or denied. If using a passive protocol, a computer system, such as computer system 150 may have preallocated a superpage to computer system 110, or, if a new superpage is needed, computer system 150 may either accept or deny a request for a new superpage. This communication between computer system 110 and computer system 150, computer system 160, and memory server computer system 170 to determine available transcendent memory may occur using conventional peer-to-peer communication methods.

In order to identify the other computer systems with transcendent memory, at the kernel startup of computer system 110, an initialization routine may be executed. A discovery process may identify other computer systems having transcendent memory, such as computer system 150, computer system 160, and memory server computer system 170. Transcendent memory API 140 may allocate transcendent memory 130 of RAM 120 on computer system 110. All other computer systems in the cluster may be notified of the creation of transcendent memory 130.

In some embodiments, some or all computer systems of system 100 may be Sun x86 Blades; network 180 may rely on a 10GBe midplane. A native Linux kernel booting on the blade may be used as a single client. The transcendent memory protocols may be implemented with Linux kernel sockets, using the infrastructure provided by OCFS2's (Oracle Cluster File System, version 2) o2net.

Figure 2:
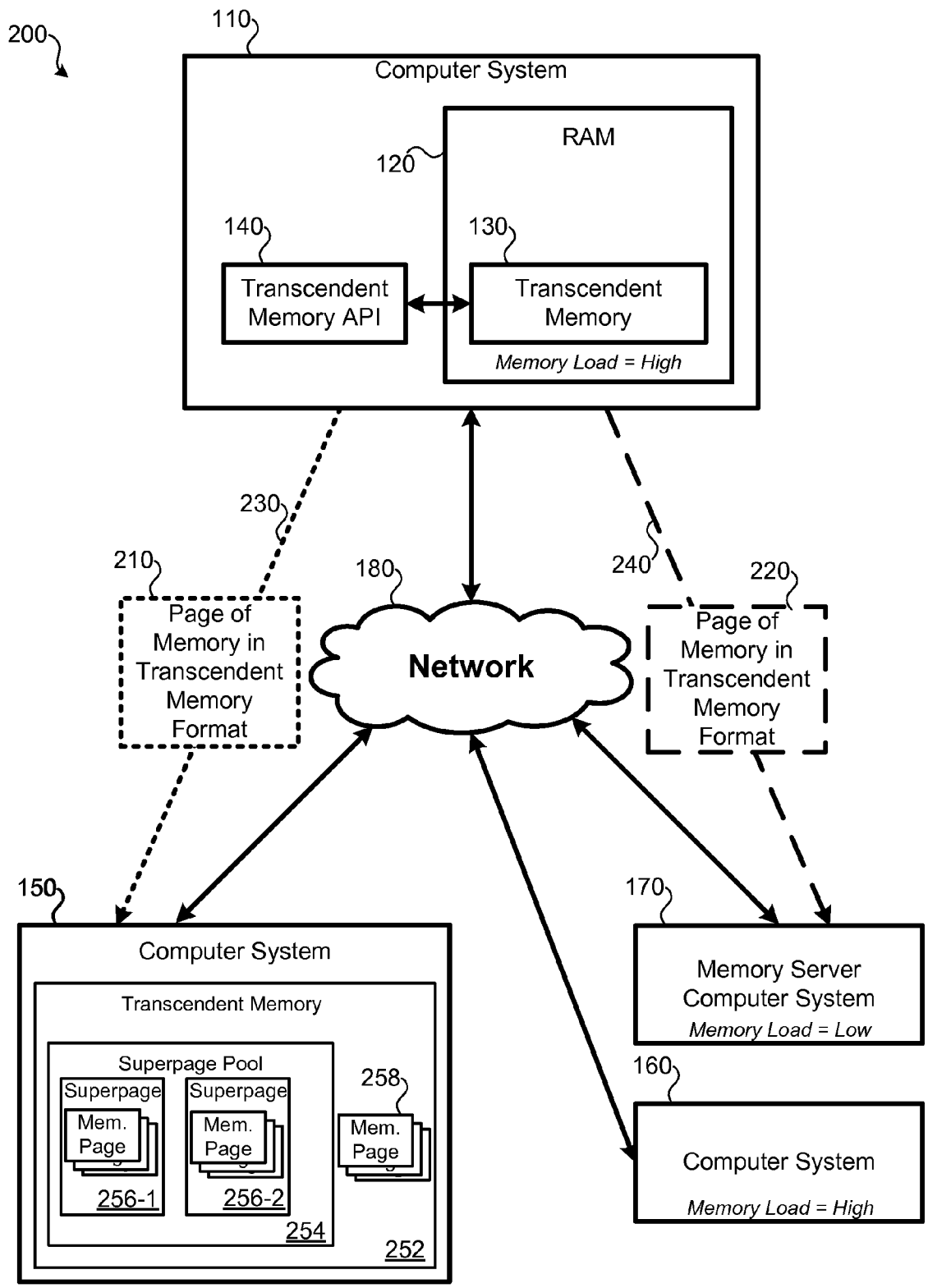
FIG. 2 illustrates an embodiment of a system that includes a computer system transferring memory pages for storage to other computer systems.

FIG. 2 illustrates an embodiment of a system 200 that includes a computer system transferring memory pages for storage to other computer systems. System 200 of FIG. 2 represents system 100 of FIG. 1 wherein computer system 110 is experiencing a high memory load and has determined to transfer memory pages stored in transcendent memory 130 to transcendent memory of other computer systems for storage. Computer system 110 may determine which computer system to use to store information. Such a determination may be based on factors such as: which computer system has the most available transcendent memory, which computer system has the fastest response time, and which computer system is designated as a memory server. In some embodiments, factors may be given varying weights. In some embodiments of the computer systems with sufficient transcendent memory available, selection may be on a random or semi-random basis. In the embodiment of system 200, computer system 150 is experiencing a low memory load, computer system 160 is experiencing a high memory load, and memory server computer system 170 is experiencing a low memory load. As such, computer system 110 determines to transfer a memory page of data from transcendent memory 130 to the transcendent memory of each of computer system 150 and memory server computer system 170.

In computer system 150, transcendent memory 252 is present. This transcendent memory may operate according to the remote-passive protocol. Which protocol is used for communication with a computer system may be selected by a user of that computer system or may be selected based on the type of data that is expected to be stored. A computer system storing data in multiple remote computer systems may utilize both the remote-passive and remote-active formats as necessary to store memory pages using the remote computer systems. In transcendent memory 252, memory pages 258 are present. These memory pages may represent memory pages stored locally for computer system 150. Superpage pool 254 may be one of multiple superpage pools present in transcendent memory 252. Superpage pool 254 may contain multiple superpages (in system 200, superpages 256-1 and 256-2 are present). Superpage pool 254 may belong to another computer system, such as computer system 110. Other superpage pools of transcendent memory 252 may belong to other computer systems. Computer system 110 may be able to determine how the transcendent memory space within superpages 256 are allocated.

The remote-passive protocol may be used for persistent pages and the remote-active protocol may be used for ephemeral pages. Superpage size may be standard x86 2 MB. Ocfs2/o2net code may be used to describe and initialize transcendent memory services.

Computer system 110 may periodically determine that it needs additional remote storage and requests another node, such as computer system 150, to allocate to computer system 110 a superpage, such as superpage 256-1. A superpage may be a predefined amount of space in transcendent memory capable of storing memory pages. As such, if a computer system receives a request for one superpage, the computer system can determine whether enough transcendent memory is available for the superpage. A superpage identifier (SID) may be an identifier of a superpage, such as the aligned physical address of the superpage, right-shifted by 21.

A computer system, such as computer system 150, may respond to the request for a superpage. The transcendent memory API (not illustrated) of computer system 150 may reject the request; if so, computer system 110 may be resilient to this rejection. If computer system 150 successfully allocates the superpage in transcendent memory 252 of computer system 150, it may return a superpage identifier (SID) to computer system 110. Computer system 150 may also record the ownership indicating that the SID belongs to a collection of superpages (referred to as a superpage pool 254 or an s-pool), which belongs to the transcendent memory API 140 of computer system 110. Superpages with a superpage pool may belong to the same computer system or different computer system. Computer system 110 may record the SID and may now have the ability to allocate the superpage on computer system 150 as it chooses. Memory pages 258 may represent memory pages that are locally stored for computer system 150.

As such, memory page 210 of transcendent memory 130, which is in a transcendent memory format, may be transferred (illustrated by dotted line 230), via transcendent memory API 140 and network 180, to a superpage of transcendent memory of computer system 150. Memory page 220, which may be in a transcendent memory format, may be transferred (illustrated by dotted line 240), via transcendent memory API 140 and network 180, to the transcendent memory of memory server computer system 170. Memory page 210 and memory page 220 may remain on computer system 150 and memory server computer system 170, respectively, until retrieved by computer system 110. If the memory load of one of these computer systems, such as computer system 150, increases sufficiently, computer system 150 may instruct computer system 110 to retrieve the memory page of computer system 110 stored by computer system 150. Such an arrangement may prevent a computer system from unnecessarily using remote transcendent memory when it can instead use local transcendent memory by clearing transcendent memory allocated to one or more remote computer systems.

The amount of time necessary to store memory page 210 and memory page 220 using computer system 150 and memory server computer system 170, respectively, via network 180 may be less time than if computer system 110 stored the memory pages locally using a storage arrangement other than RAM, such as a hard drive.

While FIG. 2 illustrates only computer system 110 storing memory pages using the transcendent memory of computer system 150 and memory server computer system 170, other computer systems may store information in the RAM of other computer systems. For example, computer system 160, which is experiencing a high memory load, may store memory pages in the transcendent memory of computer system 150 and/or memory server computer system 170.

At least two protocols may be used for communication for peer-to-peer transcendent memory between computer systems 110, 150, 160, and memory server computer system 170. These protocols may be referred to as: remote-passive and remote-active. Referring to computer system 110 transferring memory page 210 to computer system 150, the remote-passive protocol provides for storage on computer system 150 that can be addressed by computer system 110 under constraints controlled by transcendent memory API 140 (of computer system 110). The participation of computer system 150 in the remote-passive protocol may be limited to allocation and, optionally, to validating remote memory access by computer system 110 on the transcendent memory of computer system 150 allocated to computer system 110. Computer system 150 may allocate one or more superpages to computer system 110.

Using the remote-passive protocol, when computer system 110, through an asynchronous process determines that a memory page should be moved to another computer system, such as computer system 150, computer system 110 examines data structures maintained on computer system 110 to identify other computer systems that currently have sufficient unallocated S-pool space that is assigned to computer system 110 to store the page. If no other computer system has space (which, with good planning, may be rare), computer system 110 may initiate a remote allocation attempt (as discussed above) to have one or more superpages of transcendent memory at one or more computer systems allocated to computer system 110 and try again later. The asynchronous process may involve computer system 110 first storing a memory page in local transcendent memory. Periodically, a kernel thread may examine locally stored memory pages in transcendent memory to determine if (based on local and/or remote availability) the memory page should be moved.

Computer system 110 may transfer the memory page to computer system 150, indicating computer system 150, the SID, an offset into the superpage, and a length. Computer system 150 may validate that computer system 110 owns the superpage and that the copy does not trespass beyond the bounds of the superpage. Computer system 110 may be notified when the copy is complete. When computer system 110 is made aware that the copy is complete, computer system 110 may update one or more internal data structures to access the remote copy of the memory page on computer system 150 when the data contained therein is needed. The transcendent memory previously associated with the transfer of the memory page to computer system 150 may be freed to be used for other purposes. One or more transcendent memory data structures may be retained on computer system 110 and may point to an offset into a remote superpage on computer system 150.

Referring to the remote-active protocol, computer system 110 may communicate with computer system 150 using transcendent memory calls and may be oblivious to details of computer system 150's memory. Computer system 110 may act as both a transcendent memory server (meaning that computer system 110 accepts transcendent memory calls from an OS kernel running on computer system 110 and storing pages in computer system 110's local memory) and as a transcendent memory client, making standard "transcendent memory calls" to computer system 150 to copy memory pages from the transcendent memory of computer system 110 to computer system 150. As such, computer system 150 may actively participate in the transcendent memory protocol. For example, computer system 150 may dynamically allocate memory in response to receiving memory pages from computer system 110 to be stored (a "put"). Computer system 150 may also manage its own transcendent memory data structures, and may need to notify computer system 110 of certain coherency events, such as when it chooses to evict one or more memory pages belonging to computer system 110 to free up its own memory.

When transcendent memory API 140 puts a memory page, that memory page is stored in RAM 120 allocated as transcendent memory 130 and a success indicator may be returned. If insufficient local transcendent memory is available, transcendent memory protocols of transcendent memory API 140 may govern as follows: 1) if an ephemeral put, the put is failed; 2) if a persistent put and the page is currently stored (a "duplicate put"), the put is converted to a flush and the put is failed; and 3) if a persistent put and the page is not currently stored, the put is failed. Every page put by transcendent memory API 140 into a pool P is associated with an object id OID and index.

Referring to the remote-active protocol, when computer system 110, possibly through an asynchronous process, determines that a locally stored memory page (such as memory page 210) should be moved to transcendent memory of another computer system, it chooses a computer system, such as computer system 150, then "calls" computer system 150 with a transcendent memory handle and the data. Computer system 150 may return an indication of success or failure. If an indication of success is returned, computer system 110 may reclaim the space in transcendent memory 130 occupied by the memory page and may change its local data structures associated with the memory page to point generically to computer system 150.

Figure 3:
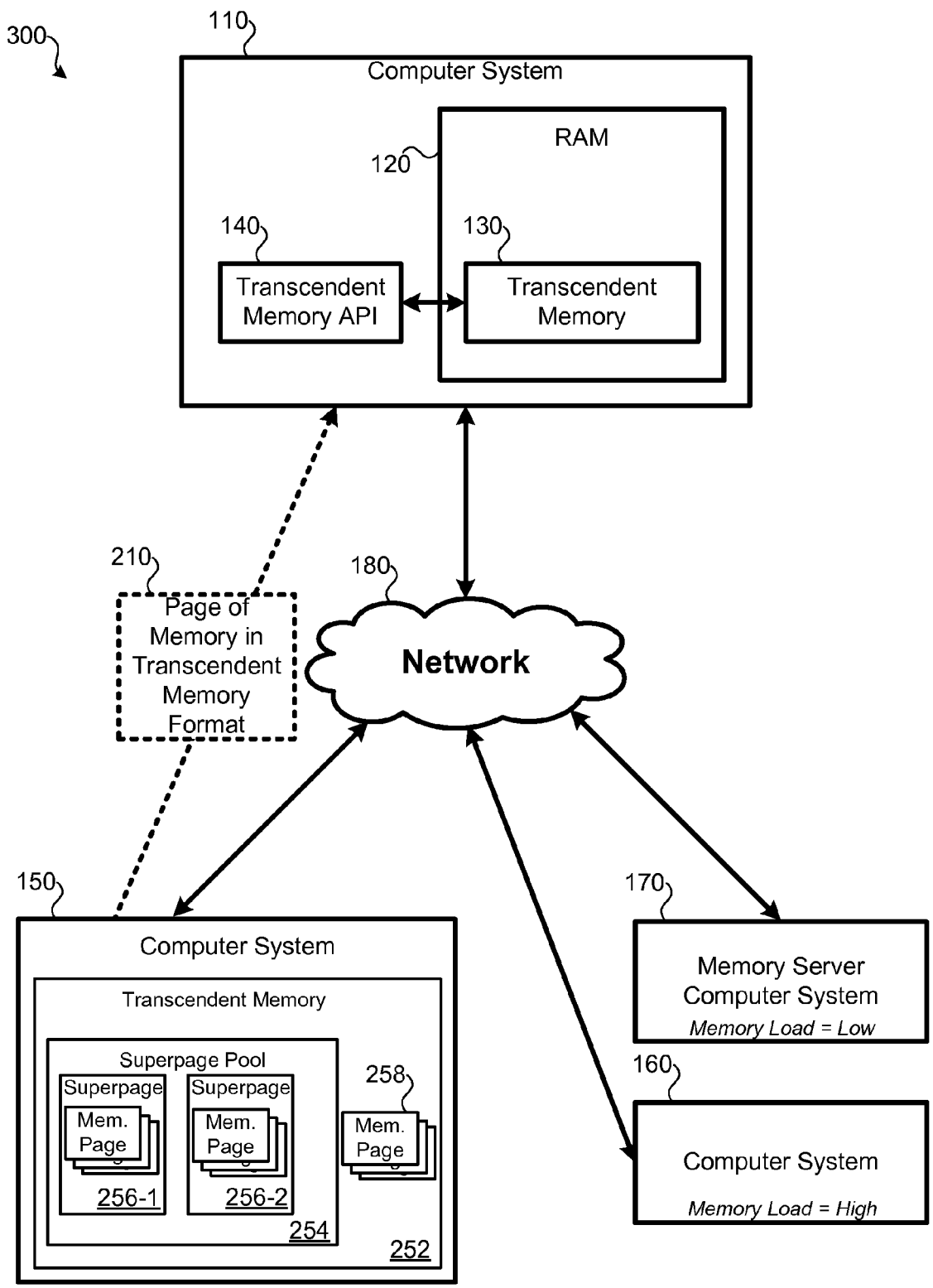
FIG. 3 illustrates an embodiment of a system that includes a computer system retrieving data from transcendent memory of another computer system.

FIG. 3 illustrates an embodiment of a system 300 that includes a computer system retrieving data from transcendent memory of another computer system. System 300 of FIG. 3 may represent system 200 of FIG. 2 in which computer system 110 is retrieving data stored in transcendent memory of computer system 150. Transcendent memory API 140 may receive a request for data stored in a page of memory not stored locally in transcendent memory 130. This page of memory may be stored in transcendent memory of another computer system, such as memory page 210 of FIG. 2. As such, computer system 110 may need to retrieve memory page 210 from computer system 150. One or more data structures of transcendent memory API 140 may indicate the appropriate location of the memory page. To retrieve the memory page, transcendent memory API 140 of computer system 110 may cause a request for memory page 210 to be transmitted to computer system 150 via network 180. In response, the transcendent memory API (not illustrated) of computer system 150 may retrieve memory page 210 from the transcendent memory of computer system 150 and transmit memory page 210 to computer system 110 via network 180. Once retrieved, memory page 210 may be stored in transcendent memory 130 and accessed by transcendent memory API 140. Memory page 210 may be flushed from the transcendent memory of computer system 150.

The amount of time necessary to transmit a request by computer system 110 to computer system 150 via network 180 and to retrieve memory page 210 from the transcendent memory of computer system 150 may be less time than if computer system 110 retrieved a memory page from a local hard drive. Similarly, such storage over of information in another computer's transcendent memory may be used instead of some other local computer-readable storage device (besides a hard drive) that takes a period of time to process a request longer than a similar request over network 180 with another computer system.

When needed, memory page 220 may be retrieved by computer system 110 from memory server computer system 170 in a similar manner to how memory page 210 was retrieved from computer system 150. Computer system 150 may rely on the remote-active or remote-passive protocol. Memory server computer system 170 may rely on the same or a different protocol from computer system 150.

When transcendent memory API 140 on computer system 110 attempts to retrieve a memory page, referred to as a "get," computer system 150 may check to see if the memory page is stored in transcendent memory. If it is not, computer system 150 may return an indication of failure to computer system 110. If the memory page is stored in transcendent memory by computer system 150, the memory page may be transferred to computer system 110 according to transcendent memory protocols. If the memory page is stored by transcendent memory of computer system 150, or belongs to an ephemeral pool and, for any reason, remote access to the memory page is unwise or impossible, the request may be converted to a flush and the get is failed. Computer system 110 and transcendent memory API 140 may ensure there is sufficient local RAM for the page (if, for example, decompression of the memory page must be done). To be clear, an ephemeral pool refers to a pool where a get to retrieve data previous put to the ephemeral pool may fail because the data has been removed. Computer system 110 should be resilient to this. A persistent pool refers to a pool where a get to retrieve data previous put to the persistent pool is expected to always succeed and the data must be available to computer system 110. Computer system 110 may not be resilient to a failed get to a persistent pool.

If the remote-passive protocol is being used, computer system 110 may remotely copy the memory page by indicating computer system 150, the SID, the offset into the superpage, and length. Computer system 150 may validate access to the memory page. Computer system 110 may wait until the remote copy operation is complete, update computer system 110's data structures, and perform any local transformations required (e.g., decompression), and return success. Computer system 150 may delete the memory page.

If the remote-active protocol is being used, computer system 110 may call computer system 150 with a transcendent memory get. If computer system 150 has the memory page, it returns the memory page. An indication of success may also be returned. If computer system 150 is not able to return the memory page, computer system 150 may return an indication of failure. Computer system 110 may wait until the success/failure indication is returned, and in the case of success, wait for the data. Computer system 110 may then update data structures, perform local transformations on the data (e.g., decompression), and return an indication of success or failure. In some embodiments, computer system 110 is resilient to a memory page being inaccessible that computer system 110 believes is stored remotely at computer system 150. For example, another copy of the memory page may be stored on a local hard drive for such an occurrence. As another example, computer system 110 may store multiple copies of data, such as a copy on computer system 150 and computer system 160 such that if one of computer systems 150 and 160 fail, a copy may be available on the other computer system.

When transcendent memory API 140 on computer system 110 wishes to flush a memory page, computer system 110 may invoke a transcendent memory flush operation; if the memory page is stored in transcendent memory locally on computer system 110, no remote access to another computer system may be necessary. In the case of the remote-active protocol, computer system 150 may be notified of the flush so computer system 150 can reclaim transcendent memory space that is no longer used. In the case of a remote-active ephemeral page, computer system 150 may notify computer system 110 that computer system 150's copy of the page has been flushed.

At certain points, a superpage pool may need to be destroyed. When transcendent memory API 140 on computer system 110 invokes a command such as "transcendent memory pool destroy," computer system 110 may wait until all currently pending operations involving the pool are complete, and notify all other nodes that the pool is destroyed and/or that these other nodes can reclaim all SIDs. Such a transcendent memory pool destroy may occur to an ephemeral pool. Some policy may run on computer system 110 to periodically evaluate whether and which memory pages should be moved from local transcendent memory to remote transcendent memory. This policy may be different for ephemeral pages versus persistent pages. Computer system 150 may have the option of reclaiming superpages in its ephemeral superpools at any time. Computer system 150 may notify the appropriate page owner that all data associated with the corresponding SID has disappeared.

A remote-initiated shutdown may result in data needing to be returned to the computer system that provided the data, such as if computer system 110 has data stored in the transcendent memory of computer system 150, which is being shut down. In such an instance, computer system 150 must free the superpages in its persistent superpage pools, and the data contained therein should be repatriated from computer system 150 to the appropriate computer systems, or another computer system's transcendent memory.

Figure 4:
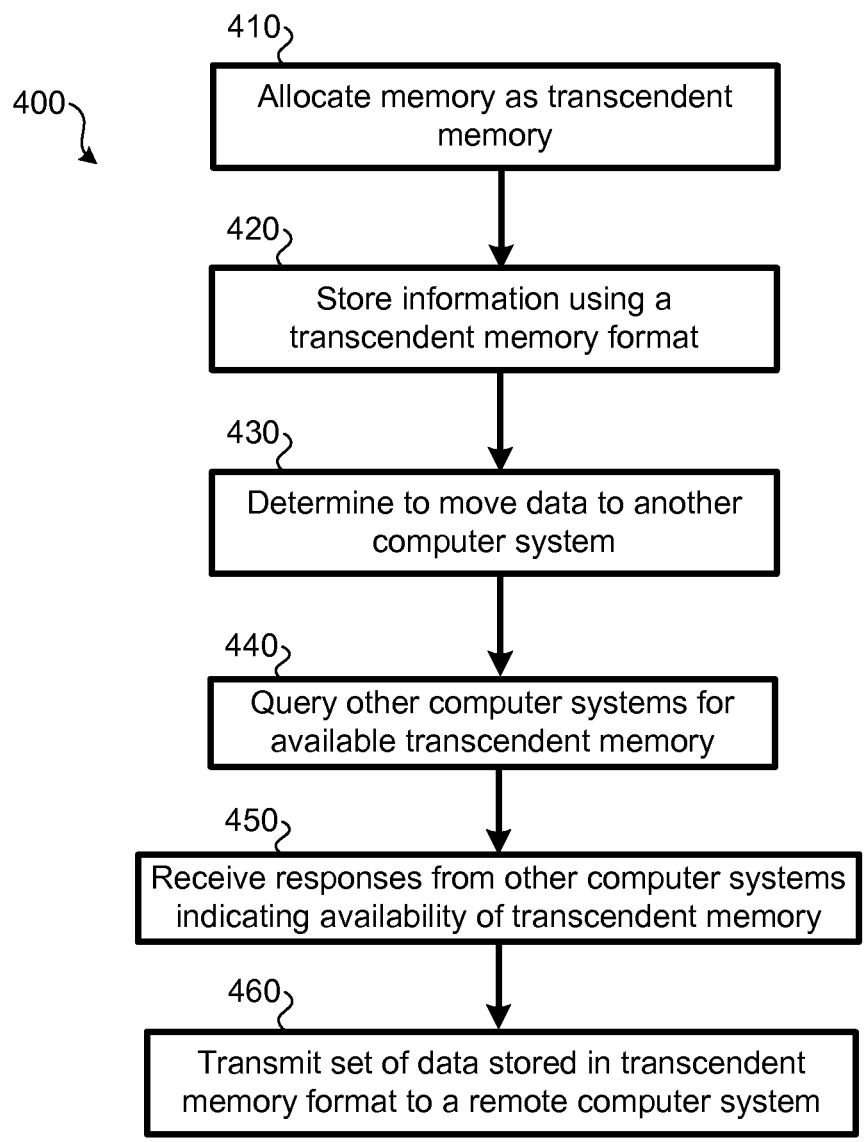
FIG. 4 illustrates an embodiment of a method for utilizing memory resources of another computer system.

Various methods may be performed by systems 100, 200, and 300 of FIGS. 1-3, respectively. FIG. 4 illustrates an embodiment of a method for utilizing memory resources of another computer system. Method 400 may be performed using system 100, system 200, or system 300 of FIGS. 1-3, respectively. Alternatively, method 400 may be performed using some other system that allows for memory of another computer system to be utilized. Each step of method 400 may be performed by a computer system, such as computer system 110 of FIG. 1. At step 410, a portion of a computer system's RAM may be allocated as transcendent memory. Referring to FIG. 1, computer system 110 may have transcendent memory 130 reserved in RAM 120. Transcendent memory 130 may be reserved such that it is accessible via only transcendent memory API 140.

At step 420, the computer system may store data in a memory page using a transcendent memory format. This memory page may be stored in the portion of RAM allocated as transcendent memory. A transcendent memory API, such as transcendent memory API 140 of FIG. 1, may access and store the data in the transcendent memory.

At step 430, the transcendent memory API of the computer system may determine that its total RAM and/or transcendent memory are over-utilized. As such, the transcendent memory API will determine to move data from local transcendent memory to the transcendent memory of another computer system.

At step 440, a request may be sent by the computer system to one or more other computer systems via a network, such as network 180 of FIG. 1, to determine if another computer system has available memory resources. Previously, the computer system may have been made aware of the other computer systems that have transcendent memory. For example, when the transcendent memory API of each computer system is initiated, a discovery process may allow the transcendent API to learn of some or all of the other computer systems connected to the network that also have transcendent memory.

At stage 450, a response may be received from each other computer system that indicates whether or not the corresponding computer system has available transcendent memory resources.

At stage 460, the responses may be used by the computer system to determine which remote computer system to use to store data. In some embodiments, if multiple computer systems have sufficient memory, selection of another computer system may be random or semi-random. In some embodiments, based on the type of data that is to be stored (e.g., ephemeral or persistent) preference may be given to a remote computer system that used either the remote-passive protocol or the remote-active protocol. Once the data has been successfully stored by the remote computer system, the local transcendent memory previously occupied at the computer system may be reused.

Figure 5A:
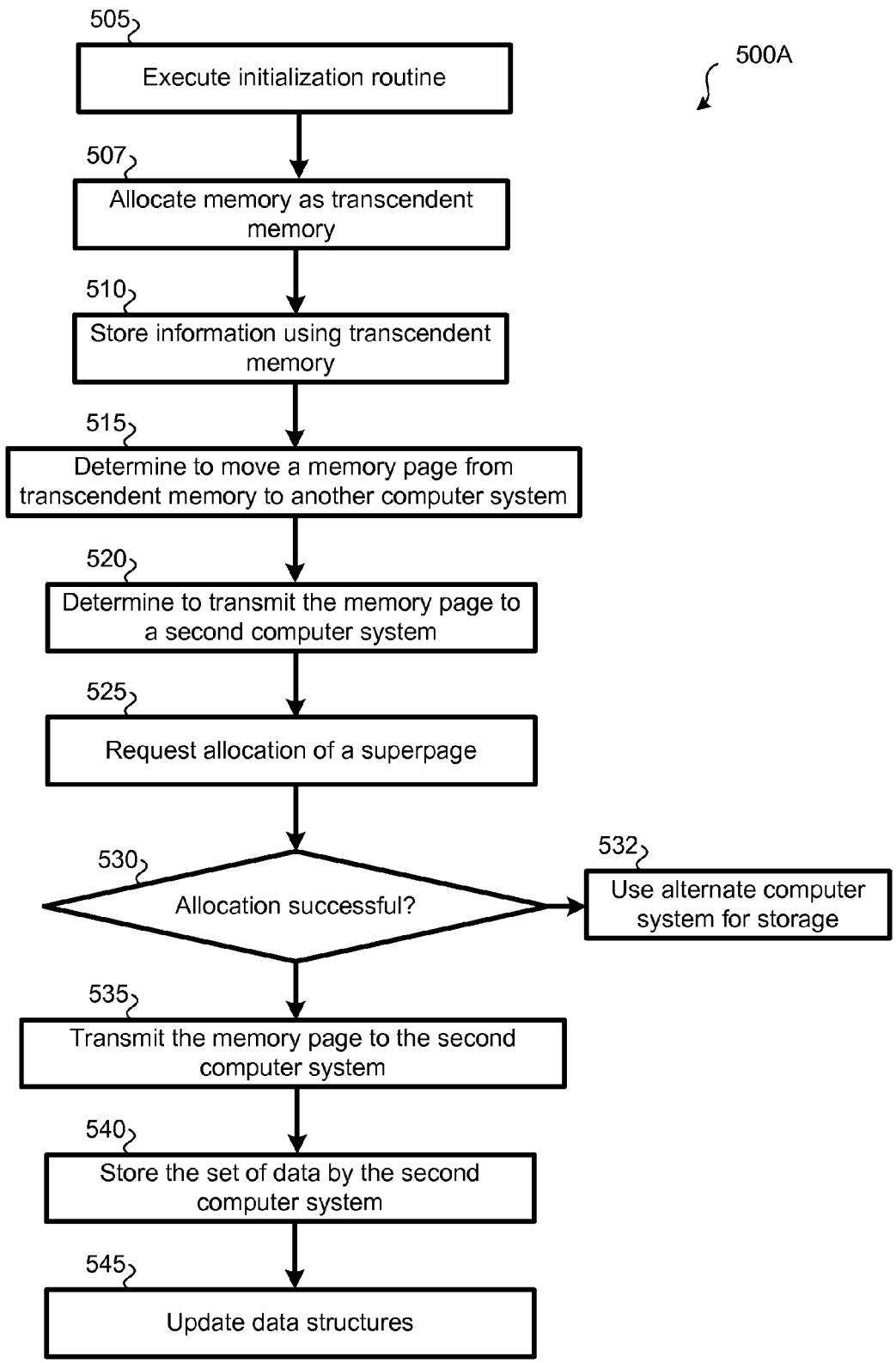
FIG. 5A illustrates an embodiment of a method for writing data to memory of another computer system.

FIG. 5A illustrates an embodiment of a method for writing data to memory of another computer system. Method 500A may be performed using the systems of FIGS. 1-3, or some other system that allows for the writing of data to memory of another remote computer system. In method 500A, data is stored in transcendent memory of another computer system using a transcendent memory remote-passive protocol. Method 500A may represent a more detailed view of method 400. Each step of method 500A may be performed by a computer system.

At step 505, a first computer system may execute an initialization routine. The initialization routine may be executed when the transcendent memory API is executed by the first computer system. The initialization routine may involve discovering other computer systems of the same cluster that have transcendent memory and also have the transcendent memory API running The transcendent memory API of the first computer system may store indications (e.g., IP addresses) of the computer systems that also have transcendent memory. At step 507, which may be part of the initialization routine, a portion of the first computer system's memory may be designated transcendent memory. This RAM which may be made available by the first computer as transcendent memory may only be accessible via the transcendent memory API. As such, reads, writes, and flushes may only be performed on this memory by the transcendent memory API. The maximum amount of RAM which may be made available by the first computer system as transcendent memory may be predefined as a fixed amount or percentage of a computer system's total RAM. As such, the amount of transcendent memory may vary dynamically up to the predefined maximum amount. In some embodiments, a user may be able to define the amount of RAM to designate as transcendent memory. In some embodiments, a portion of the computer system's transcendent memory may be made available for memory pages from other computer systems with the remainder used for pages of the first computer system, the balance between the two which may vary dynamically, with the sum not exceeding the maximum designated size.

At step 510, the first computer system may store various data as part of memory pages in transcendent memory. The first computer system may continue to store and recall data from transcendent memory without interacting with another computer system (for use of the other computer system's memory) for as long as the first computer system has sufficient memory. For example, if the first computer system has an adequate amount of RAM for the processes it is executing, the need to rely on the RAM of a remote computer system may be infrequent. This may involve the data being compressed if the transcendent memory stores data in a compressed format.

At step 515, when the first computer system's RAM and/or transcendent memory is full or nearly full, the transcendent API may determine to move one or more memory pages to a remote computer system. The transcendent API may be triggered to move data to a remote computer system when a threshold amount of the first computer system's transcendent memory is in use, such as a percentage of the total (e.g., 97%).

At step 520, a particular remote computer system may be selected, referred to as the second computer system. For example, referring to method 400, the steps 440 and 450 may be used to identify one or more remote computer systems that have sufficient available transcendent memory for use by the first computer system. In some embodiments, the first computer system, in accordance with the remote-passive protocol, may have already been assigned one or more superpages by the second computer system. If these superpages are not yet filled with memory pages from the first computer system, method 500 may proceed to step 535 and use these pre-assigned superpages.

If the first computer system requires transcendent memory space and a superpage has not been allocated to the first computer system by the second computer system, at step 525 the first computer system may request the allocation of one or more superpages. This request may be transmitted to the second computer system. For example, referring to system 100 of FIG. 1, the request for one or more superpages may be transmitted by computer system 110 to computer system 150 via network 180.

At step 530, the first computer system may receive a response from the second computer system that indicates whether the requested allocation of one or more superpages was successful. If not, at step 532 the first computer system may attempt to use another remote computer system to store data remotely. If the request for a superpage was successful, the second computer system may provide the first computer system with a superpage identifier (SID). The second computer may store an indication that the first computer system is the owner of the superpage and/or an indication that the first computer system owns a superpage pool that includes multiple superpages at the second computer system.

At step 535, a memory page containing data from the first computer is transmitted to the second computer system for storage as part of the superpage assigned at step 530, or, if an unused superpage was previously assigned to the first computer system, the previously-assigned superpage may be used. The memory page to be stored using the superpage at the second computer system may be accompanied by data that indicates: 1) the second computer system (e.g., an IP address), the SID of the superpage to be used for storage of the memory page, an offset within the superpage to store the memory page, and a length.

At step 540, the memory page may be stored by the second computer system. In some embodiments, the transcendent memory API of the second computer system may verify that the memory page provided by the first computer system does not trespass the boundaries of the allocated superpage. The second computer system may notify the first computer system if the memory page was or was not stored successfully.

At step 545, transcendent memory data structures at the first computer system may be updated by the transcendent API to point to the proper location at the second computer system for the remotely stored memory page. As such, one or more transcendent memory data structures at the first computer system store an indication of the superpage and offset of the remotely stored memory page. The transcendent memory at the first computer system previously used to store the memory page may be freed for storage of other data. A copy of the memory page may also be stored locally, such as to a hard drive, in case the remote copy of the memory page unexpectedly becomes unavailable.

Figure 5B:
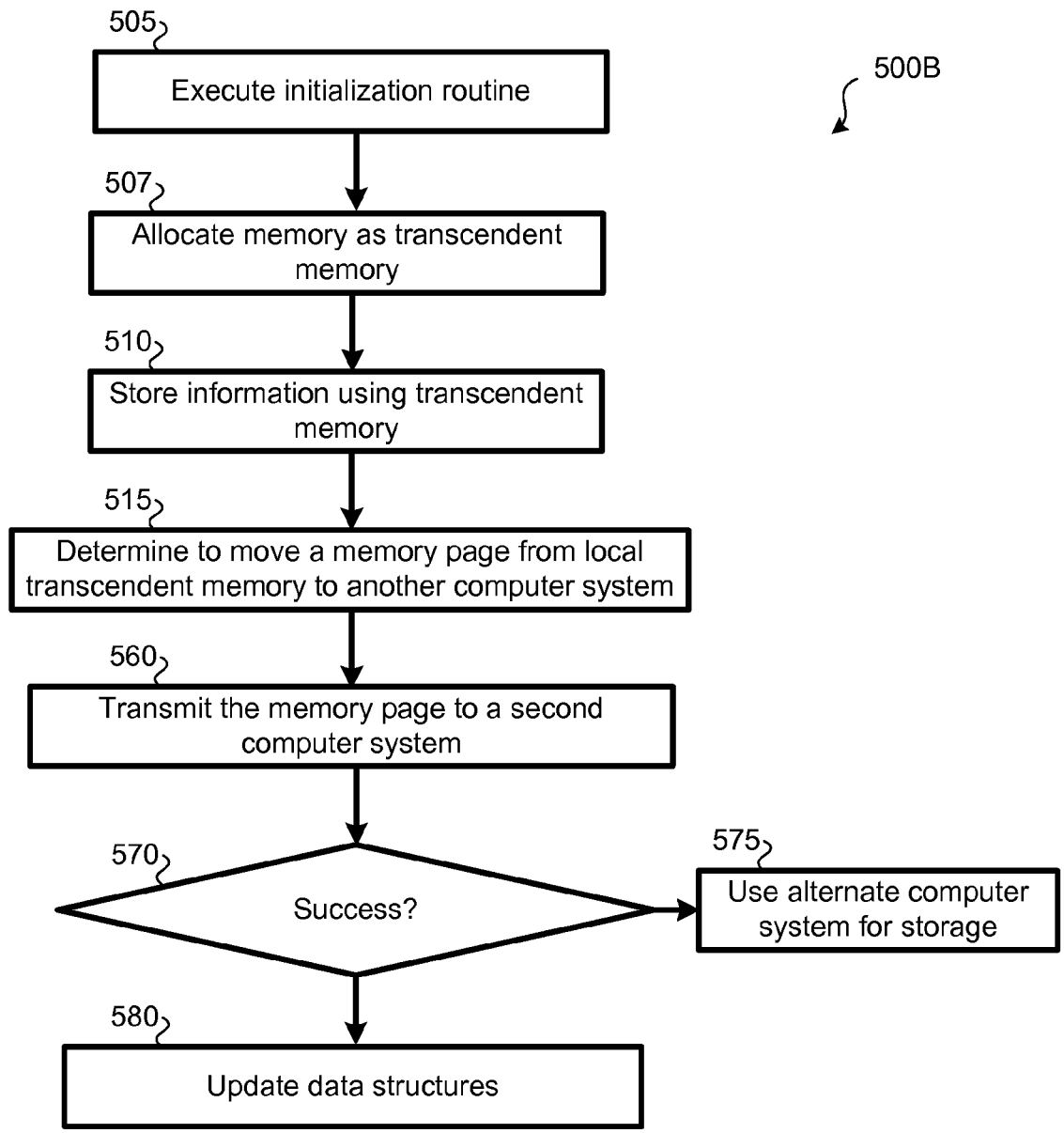
FIG. 5B illustrates another embodiment of a method for writing data to memory of another computer system.

FIG. 5B illustrates an embodiment of a method for writing data to memory of another computer system. Method 500B may be performed using the systems of FIGS. 1-3, or some other system that allows for the writing of data to memory of another computer system. In method 500B, data is stored in transcendent memory of another computer system using a transcendent memory remote-active protocol (as opposed to the remote-passive protocol of method 500A). Method 500B may represent a more detailed view of method 400. Each step of method 500B may be performed by a computer system. Steps 505 through 515 of method 500B may be the same as the corresponding steps of method 500A.

At step 560, the memory page to be stored by a remote computer system may be transmitted to a second computer system. The memory page may be transmitted along with a transcendent memory handle. The transcendent memory handle may be a non-linear indicator used to identify a memory page. For example, the transcendent memory handle may be associated with a memory page when it is put. When a get is used to retrieve the transcendent memory page, the transcendent memory handle may be used to identify the memory page to be recalled.

At step 570, the second computer system may return an indication of whether storage of the memory page in the second computer system's transcendent memory was successful or not. Before altering the memory page at the first computer, the first computer and transcendent memory API may wait for a response from the second computer. According to the remote-active protocol, the second computer system may dynamically allocate transcendent memory for the memory page from the first computer system when the memory page is received. As such, a superpage may not be reserved ahead of time for data from the first computer system. If storage by the second computer is indicated by the response as failed, at step 575 the first computer system may attempt to store the memory page using an alternate computer system. In some embodiments, if the response is failed and the memory page is the only copy of the data (referred to as "dirty" data), the first computer system may store the memory page on local disk storage. If the data contained on the memory page is already identically retrievable from local disk storage (referred to as "clean" data), the first computer system may discard the memory page because it may later access the data from the local disk.

If the second computer system successfully stores the memory page in the second computer system's transcendent memory, the first computer system may receive an indication of a successful storage from the second computer system. At step 580, one or more transcendent memory data structures at the first computer system may be updated to reflect that the memory page is stored by the second computer system. The transcendent memory at the first computer system previously used for storage of the memory page may now be freed.

Figure 6:
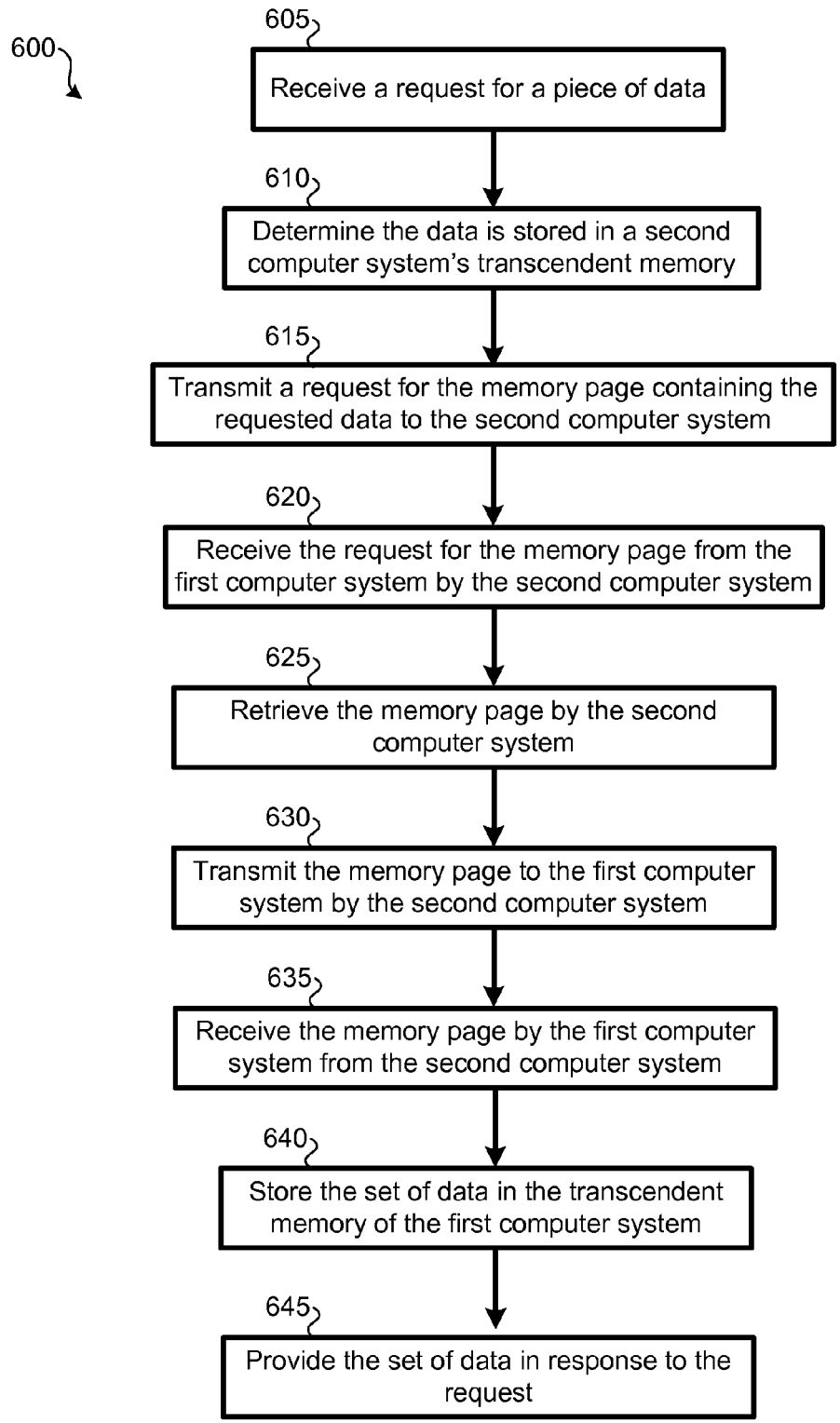
FIG. 6 illustrates an embodiment of a method for accessing data stored in memory of another computer system.

FIG. 6 illustrates an embodiment of a method 600 for accessing data stored in memory of another computer system. Method 600 may be performed using the systems of FIGS. 1-3, or some other system that allows for the accessing of data stored in memory of another computer system. Each step of method 600 may be performed by a computer system. Method 600 may represent the retrieval of data according to the transcendent memory remote-passive or the remote-active protocol.

At step 605, a request may be received by the transcendent memory API of a first computer system requesting a memory page or data within a memory page. At step 610, the transcendent memory API may determine that the requested data is stored remotely in a memory page at transcendent memory of a second computer system. The transcendent memory API may determine that the data is remote based on one or more transcendent memory data structures that identify where data is stored.

At step 615, a request for the memory page that contains the data may be transmitted to the second computer system. If the remote-passive protocol is being used, the request may contain the SID, an offset into the superpage, and a length of the memory page to be returned. If the remote-active protocol is being used, the request may specify an identifier of the memory page to be returned. At step 620, the request may be received by the second computer system. At step 625, the memory page may be retrieved by the transcendent memory API of the second computer system. If the second computer system is unable to retrieve the memory page, a failure message may be returned to the first computer system instead of the memory page. At step 630, the memory page (or indication of failure) is transmitted to the first computer system. The first computer system may be waiting for the memory page.

At step 635, the memory page may be received by the first computer system. At step 640, the memory page may be stored locally by the first computer system in its transcendent memory by the transcendent memory API. At step 645, the data requested at step 605 may be returned from the memory page to the process that requested the data. This step may involve the data being uncompressed, if, when stored in transcendent memory, the memory page containing the data was compressed.

Different variants of commands used by the transcendent memory API of the first computer system to retrieve the data may indicate whether the transcendent memory API of the second computer system keeps or flushes the memory page that has been retrieved by the first computer system. If the memory page requested by the first computer system is not present (as expected) on the second computer system, the first computer system may be resilient by accessing a backup copy of the memory page, such as a copy of the memory page stored locally on a hard drive or in transcendent memory of another remote computer system.

While methods 400, 500A, 500B, and 600 are directed to storing (putting) and retrieving (getting) data from transcendent memory in remote computer systems, other functions may also be performed. For example, a flush command may be performed by a transcendent memory API. This may be performed locally by changing the transcendent memory data structures at the first computer system (whether the memory page is stored in local transcendent memory or in a remote computer system). When the remote-active protocol is being used, the transcendent memory API of the remote computer system may also be notified so that it can reclaim the transcendent memory space occupied by the memory page being flushed. However, in the case of the remote-passive protocol being used, the first computer system may only need to update local transcendent memory data structures, because the first computer system is responsible for how space within the remote superpage is allocated.

In the remote-active protocol, the second computer system (the computer system storing data for the first computer system) may require additional memory. In order to acquire such memory, it may flush memory pages stored by other computer systems. To do this, the second computer system may perform a flush of the memory page belonging to the first computer system. The first computer system may be given the opportunity to reclaim the memory page prior to the flush. In the remote-passive protocol, the second computer system may reclaim superpages. The second computer system may notify the first computer system of the SID of superpages to be reclaimed. The first computer system may then be given the opportunity to reclaim the memory pages present in the superpages to be reclaimed.

If the second computer system is shut down or restarted, before the shutdown or restart is completed, the first computer system (and any other computer system using the transcendent memory of the second computer system) may be notified and given the opportunity to reclaim memory pages such that they are not lost during the restart process.

Figure 7:
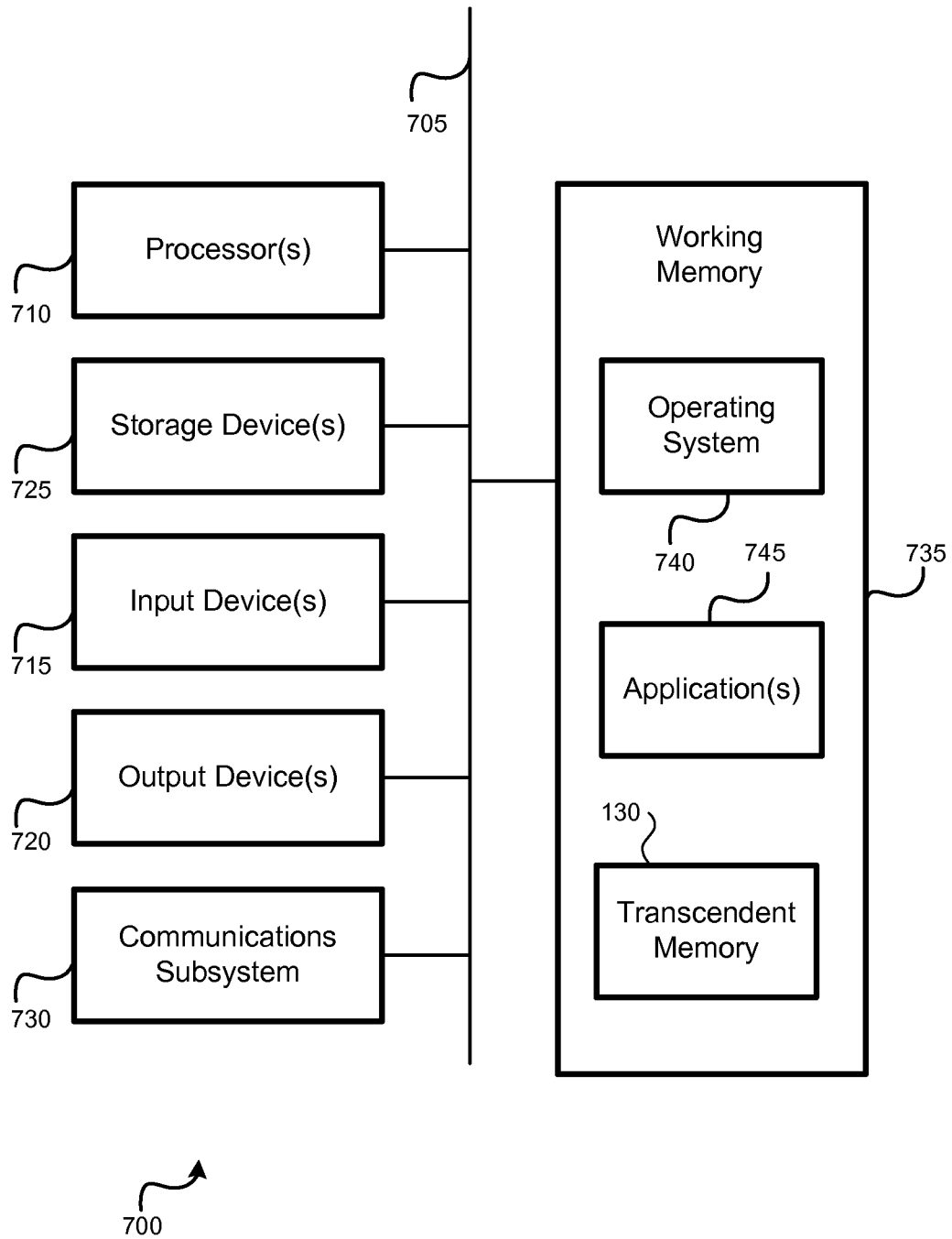
FIG. 7 illustrates an embodiment of a computer system.

FIG. 7 illustrates an embodiment of a computer system. Such a computer system may be used to perform the methods of the application. Computer system 700 may represent computer system 110, computer system 150, computer system 160, memory server computer system 170 (each of FIG. 1), or any other computer system discussed herein. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation, one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth™ device, an 702.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, transcendent memory 130 (in RAM, as previously described), device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing the described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

While the above description focuses on flowcharts, other visual representations of data may employ similar methods and systems to emphasize and deemphasize data to make the visual representation of information more comprehensible to a user.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for a first computer system to utilize storage of a second computer system, the method comprising:
    allocating, by the first computer system, a first portion of a first memory of the first computer system for use by a first memory-access application programming interface (API);
    allocating, by the second computer system, a second portion of a second memory of the second computer system for use by a second memory-access API;
    determining, by the first computer system, to move a set of data from the first portion of the first memory of the first computer system to memory of another computer system;
    transferring, by the first computer system, to the second computer system, the first set of data from the first portion of the first memory for storage in the second portion of the second memory of the second computer system;

storing, by the second computer system, using the second memory-access API, the set of data in the second portion of the second memory;

transmitting, by the first computer system, to each computer system of a plurality of computer systems, a request for available memory resources, wherein the plurality of computer systems comprises the second computer system; and receiving, by the first computer system, from each computer system of the plurality of computer systems, memory resources at the corresponding computer system of the plurality of computer systems.

2. The method for the first computer system to utilize the storage of the second computer system of claim 1, wherein:

data stored in the first portion of the first memory and the second portion of the second memory are stored in fixed-size memory pages; and transferring, by the first computer system, to the second computer system, the first set of data from the first portion of the first memory to the second portion of the second memory of the second computer system comprises transferring a minimum of one memory page.

3. The method for the first computer system to utilize the storage of the second computer system of claim 1, further comprising:

transmitting, by the first computer system, to the second computer system, a request for the set of data;

retrieving, by the second computer system, the set of data using the second API; and transmitting, by the second computer system, the set of data to the first computer system.

4. The method for the first computer system to utilize the storage of the second computer system of claim 1, further comprising:

allocating, by the second computer system, a superpage of the second portion of the second memory to the first computer system, wherein:

the superpage comprises a plurality of pages;

a size of the superpage is predetermined; and the first computer system is permitted access to the superpage.

5. The method for the first computer system to utilize the storage of the second computer system of claim 4, wherein determining to move the first set of data from the first portion of the first memory of the first computer system to memory of another computer system comprises:

identifying, by the first computer system, the second computer system having sufficient available memory resources in the second portion of the second memory to store the set of data.

6. The method for the first computer system to utilize the storage of the second computer system of claim 1, wherein determining, by the first computer system, to move the set of data from the memory of the first computer system to memory of another computer system further comprises:

determining that storing the set of data in memory of another computer system will result in a faster access time to the set of data than storing the set of data on a computer-readable disk.

7. A computer program product residing on a non-transitory processor-readable medium and comprising processor-readable instructions configured to cause a processor to:

allocate a first portion of a first memory of a first computer system for use by a first memory-access application programming interface (API);

determine to move a set of data from the first portion of the first memory of the first computer system to memory of another computer system;

cause a transfer to a second computer system of the first set of data from the first portion of the first memory for storage in a second portion of a second memory of the second computer system;

cause, using the first memory-access API, the set of data from the first portion of the first memory to be deleted;

cause a request for available memory resources to be transferred to each computer system of a plurality of computer systems, wherein the plurality of computer systems comprises the second computer system; and cause a response indicating an availability of memory resources at each computer system of the plurality of computer systems to be received.

8. The computer program product of claim 7, wherein:

data stored in the first portion of the first memory are stored in fixed-size memory pages; and the processor-readable instructions configured to cause the transfer to the second computer system of the first set of data from the first portion of the first memory require a minimum transfer of one memory page.

9. The computer program product of claim 7, wherein the processor-readable instructions further comprise additional processor-readable instructions configured to cause the processor to:

cause a request to be transferred to the second computer system for the set of data; and cause the set of data to be received from the second computer system.

10. The computer program product of claim 7, wherein the processor-readable instructions configured to cause the processor to determine to move the first set of data from the first portion of the first memory of the first computer system to memory of another computer system further comprise additional processor-readable instructions configured to cause the processor to:

identify the second computer system as having sufficient available memory resources in the second portion of the second memory to store the set of data.

11. The computer program product of claim 7, wherein the processor-readable instructions configured to cause the processor to determine to move the first set of data from the first portion of the first memory of the first computer system to memory of another computer system further comprise additional processor-readable instructions configured to cause the processor to:

determine that storing the set of data in memory of another computer system will result in a faster access time to the set of data than storing the set of data on a computer-readable disk.

12. A memory access system for a first computer system to utilize storage of a second computer system, the memory access system comprising:

the first computer system, comprising:

a first processor; and a first memory communicatively coupled with and readable by the first processor and having stored therein a first series of processor-readable instructions which, when executed by the first processor, cause the first processor to:

allocate a first portion of the first memory for use by a first memory-access application programming interface (API);

determine to move a set of data from the first portion of the first memory to memory of another computer system;
cause the first set of data from the first portion of the first memory to be transferred for storage to the second computer system;
cause, using the first memory-access API, the set of data from the first portion of the first memory to be deleted;
cause a request for available memory resources to be transmitted to each computer system of a plurality of computer systems, wherein the plurality of computer systems comprises the second computer system; and
cause a response indicating an availability of memory resources to be received from each computer system of the plurality of computer systems;
the second computer system, comprising:
a second processor; and
a second memory communicatively coupled with and readable by the second processor and having stored therein a second series of processor-readable instructions which, when executed by the second processor, cause the second processor to:
allocate a second portion of the second memory of the second computer system for use by a second memory-access API; and
cause the set of data in the second portion of the second memory to be stored using the second memory-access API.

13. The memory access system for the first computer system to utilize the storage of the second computer system of claim 12, wherein:
data stored in the first portion of the first memory and the second portion of the second memory are stored in fixed-size memory pages; and
the first series of processor-readable instructions that cause the first set of data from the first portion of the first memory to be transferred to the second portion of the second memory of the second computer system require a transfer of a minimum of one memory page.

14. The memory access system for the first computer system to utilize the storage of the second computer system of claim 12, wherein:
the first series of processor-readable instructions further comprise instructions that, when executed by the first processor, cause the first processor to cause a request for the set of data to be transferred to the second computer system; and
the second series of processor-readable instructions further comprise additional processor-readable instructions that, when executed by the second processor, cause the second processor to:
cause the set of data to be retrieved using the second API; and
cause the set of data to be transmitted to the first computer system.

15. The memory access system for the first computer system to utilize the storage of the second computer system of claim 12, wherein:
the second series of processor-readable instructions further comprise instructions that, when executed by the second processor, cause the second processor to:
allocate a superpage of the second portion of the second memory to the first computer system, wherein:
the superpage comprises space for a plurality of memory pages;
a size of the superpage is predetermined; and
the first computer system is permitted access to the superpage.

16. The memory access system for the first computer system to utilize the storage of the second computer system of claim 15, wherein the first series of processor-readable instructions configured to cause the first processor to determine to move the first set of data from the first portion of the first memory of the first computer system to memory of another computer system further comprise additional processor-readable instructions that, when executed by the first processor, cause the first processor to:
identify the second computer system as having sufficient available memory resources in the second portion of the second memory to store the set of data.

17. The memory access system for the first computer system to utilize the storage of the second computer system of claim 12, wherein the first series of processor-readable instructions configured to cause the first processor to determine to move the first set of data from the first portion of the first memory of the first computer system to memory of another computer system further comprise additional processor-readable instructions that, when executed by the first processor, cause the first processor to:
determine that storing the set of data in memory of another computer system will result in a faster access time to the set of data than storing the set of data on a computer-readable disk.

* * * * *

UNITED STATES PATENT AND TRADEMARK OFFICE
CERTIFICATE OF CORRECTION

| | | |
|---|---|---|
| PATENT NO. | : 8,775,755 B2 | Page 1 of 1 |
| APPLICATION NO. | : 13/224527 | |
| DATED | : July 8, 2014 | |
| INVENTOR(S) | : Magenheimer et al. | |

It is certified that error appears in the above-identified patent and that said Letters Patent is hereby corrected as shown below:

In the Claims

In column 21, line 10, in Claim 1, delete "systems," and insert -- systems, a response indicating an availability of --, therefor.

Signed and Sealed this
Tenth Day of March, 2015

Michelle K. Lee
*Deputy Director of the United States Patent and Trademark Office*